United States Patent

[11] 3,591,022

[72] Inventors Anatoly Emelyanovich Polyakov
Ulitsa Gagarina 6, Kv. 58;
Ivanovich Evgeny, Murmonsk, prospekt Lenina, 34, Kv. 3; Alexei Petrovich Milyakov, Ulitsa Kholobystova, 31, kv. 72, all of Murmansk, U.S.S.R.
[21] Appl. No. 818,631
[22] Filed Apr. 23, 1969
[45] Patented July 6, 1971
[32] Priority June 24, 1968, June 24, 1968
[33] U.S.S.R.
[31] 1252801 and 1252802

[54] CARGO CRANE
7 Claims, 5 Drawing Figs.
[52] U.S. Cl. .................................................. 214/13, 214/14
[51] Int. Cl. .................................................. B65g 67/58
[50] Field of Search .......................................... 214/12-–15; 212/3, 144; 254/144, 149, 175, 198

[56] References Cited
UNITED STATES PATENTS
| 2,293,936 | 8/1942 | Crooke | 214/14 UX |
| 2,854,154 | 9/1958 | Hepinstall | 214/14 |
| 3,107,790 | 10/1963 | Lehmann | 212/3 (A) |

FOREIGN PATENTS
| 151,941 | 11/1962 | U.S.S.R. | 214/14 |
| 171,752 | 5/1965 | U.S.S.R. | 214/14 |

Primary Examiner—Gerald M. Forlenza
Assistant Examiner—Frank E. Werner
Attorney—Holman & Stern ABSTRACT: A cargo crane for transporting cargo from one object to another object under conditions of the mutual vibration of objects, particularly ships operating under rough sea conditions, in which cargo ropes, a horizontally mounted jib and a suspension define an imaginary isosceles truncated pyramid, with the ropes being so connected to the system following up the mutual vibration of objects as to provide equal tension of the ropes, thereby ensuring nonimpact and a precise placing of the cargo.

PATENTED JUL 6 1971  3,591,022

SHEET 1 OF 3

CARGO CRANE

BACKGROUND OF THE INVENTION

The present invention relates to cargo cranes used for transporting cargo from one object to another under conditions of mutual vibration of the objects, and particularly ships operating under rough sea conditions. The invention can also be used for transporting cargo from the shore to a ship, and vice versa, under rough sea conditions.

It is known in the prior art to provide a cargo crane for transporting cargo from one object to another under conditions of mutual vibration of the objects, which comprises a load beam constituted as a boom having a jib secured at the free end thereof and a load hoist connected to a rope cargo suspension and to an object being serviced through the intermediary of a system following up the mutual vibration of the objects. In the known crane, the rope cargo suspension is provided with one cargo rope.

While such cranes make it possible to follow up the mutual vibration of the ships when lowering or lifting cargo, the cranes do not possess sufficient reliability in operation, as they do not eliminate the possibility of the cargo swinging under the rolling action of the ship, wind, inertia forces, etc.

Among other disadvantages of loading cranes having a single-rope suspension are the following:

the swinging of the cargo as it is suspended from one point only;

the impossibility of preserving the cargo horizontal displacement upon a change in the boom length, with the hoist stopped; and the curvilinear trajectory of the cargo displacement when it is being lowered and lifted without changing the boom length, which hampers the accuracy of placing the cargo.

It is also known in the prior art to provide cargo cranes with a multiple-rope cargo suspension, which are disadvantageous in that such assemblies do not provide for a uniform distribution of load on the ropes and a nonimpact placing of cargo.

Among the disadvantages of this particular type of cargo cranes are the following:

the unequal tension of the ropes upon a change in the boom length, resulting from a displacement of the cargo center of gravity towards the pulling ropes or the cargo rope;

the dynamic redistribution of the forces of the ropes tension, upon a change in the boom length, resulting in a swinging of the cargo; and the absence of a followup device capable of providing a smooth placing of the cargo on, or removal from, the deck of a ship under rough sea conditions.

It is an object of the present invention to eliminate the aforesaid disadvantages.

SUMMARY OF THE INVENTION

The present invention has for its primary object the provision of a cargo crane with such a rope suspension and such connection thereof with the load beam which provides for a nonimpact and precise stacking of cargo onto an object being serviced under rough sea conditions.

This object is accomplished in that in a cargo crane used for transporting cargo from one object to another under conditions of mutual vibration of the objects, particularly operating ships under rough sea conditions, comprises a load beam defined by a boom having a jib connected to the free end thereof and a cargo hoist connected to a rope cargo suspension and to an object being serviced through the intermediary of a system following up the mutual vibration of the objects, the load beam linked with the jib in such a manner that the latter is constantly maintained in a horizontal position and the rope cargo suspension has at least three cargo ropes so passing through the jib that they constitute together with the jib and the suspension an imaginary isosceles truncated pyramid, with the cargo ropes being so connected with the system following up the mutual vibration of the objects as to provide for an equal tension of the cargo ropes and disposition of the points at which the suspension is secured in one horizontal plane.

It is expedient to constantly hold the jib in a horizontal position by means of two power cylinders operatively interconnected and hinged, one to the boom and the jib, and the other to the boom and the crane base and to hinge the jib with the boom.

It is convenient to define the system following up the mutual vibration of the objects of at least three pulley block arrangements having a common movable shaft and a common stationary shaft mounting pulley blocks which carry the cargo ropes and the rope connecting the system following up the mutual vibration of the objects with the object being serviced.

In order to simplify the structure of the crane it is expedient to use the stationary shaft as the axis of a hinge-joint connecting the jib with the boom.

To make the crane compact and simple in structural detail, it is advisable to pass the cargo ropes onto cargo blocks mounted on the jib, whereas to provide for a precise placing (removal) of cargo to arrange the planes of rotation of the cargo blocks in such a manner that they are aligned with the bisectrix of the pyramid.

In order to preserve the horizontal displacement of cargo upon a change in the length of the boom with the load hoist stopped, it is desirable to arrange the power cylinders in such a manner that their axes are disposed parallel with respect to each other.

The following description of an exemplary embodiment of the present invention is given with reference to the accompany drawings, in which:

DETAILED DESCRIPTION OF THE INVENTION

Figure 1:
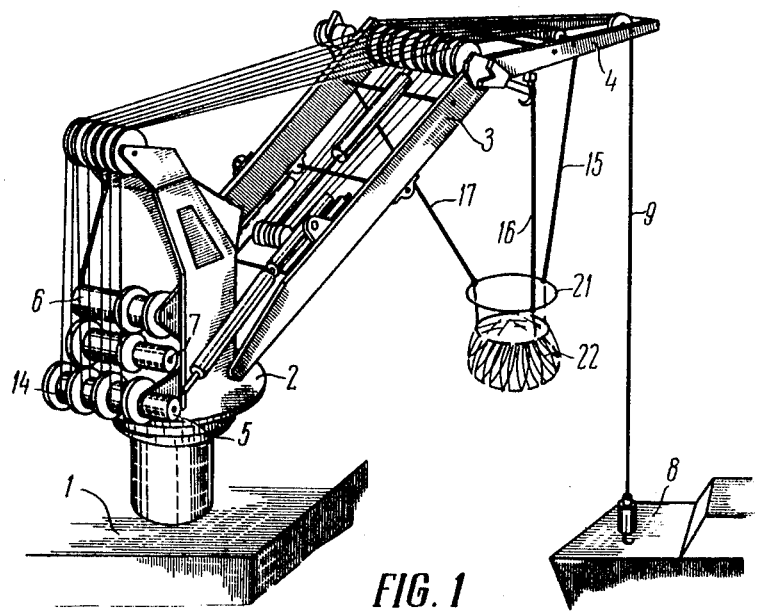
FIG. 1 is a general view of a cargo crane, according to the invention.

A cargo boom crane used for transporting cargo from one ship to another under rough sea conditions, as shown in FIG. 1, comprises a base 2 mounted on the deck of a base ship 1 and which carries a load beam defined by a turntable boom 3 provided with a jib 4. Also mounted on the base 2 is a load hoist 5, a hoist 6 of a followup system, a hoist 7 for changing the boom length and a hoist (not shown) for turning the crane.

Figure 2:
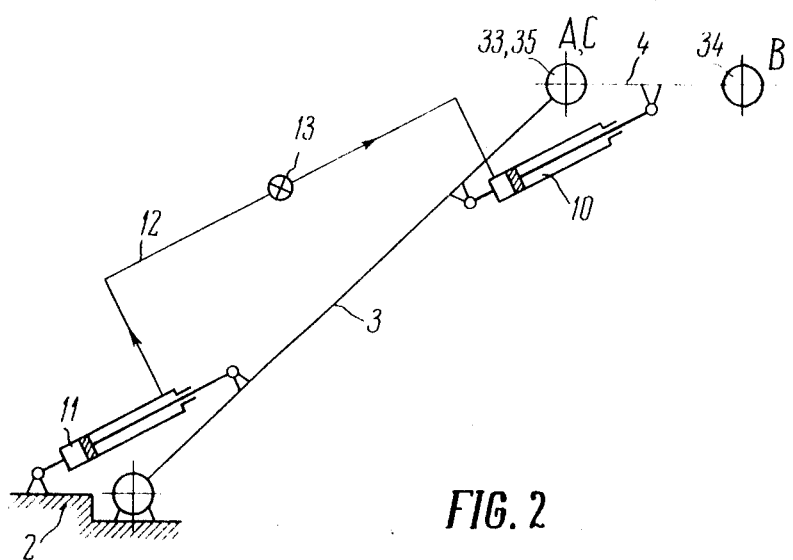
FIG. 2 is a view diagrammatically illustrative the connection of the boom with the jib constantly held in a horizontal position by means of power cylinders.
Figure 3:
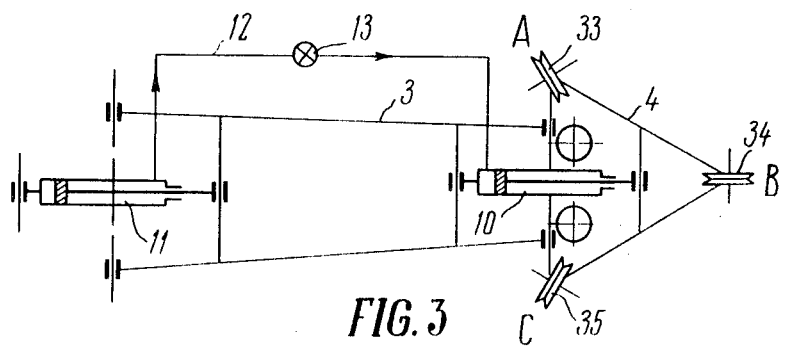
FIG. 3 is a top view of the arrangement shown in FIG. 2.

A ship 8 being serviced (loaded or unloaded) is connected to the crane by a followup rope 9 which is essentially an element of the system following up the mutual vibration of ships. The boom 3 is hinged to the jib 4 which is constantly held in a horizontal position by means of two hydraulically interconnected power cylinders. Hydraulic cylinders 10, 11 FIGS. 2, 3) are used as the power cylinders, with cylinder 10 being hinged to the boom 3 and the jib 4, and the other cylinder 11 to the boom 3 and the base 2. The two hydraulic cylinders are interconnected via a pipeline 12 equipped with a shutoff valve 13 for providing communication between the piston space of one cylinder and the rod space of the other cylinder. The hydraulic cylinders are so arranged that their axes are parallel with respect to each other whereby it is possible to preserve the horizontal direction of the cargo displacement at various changes in the length of the boom 3.

Figure 4:
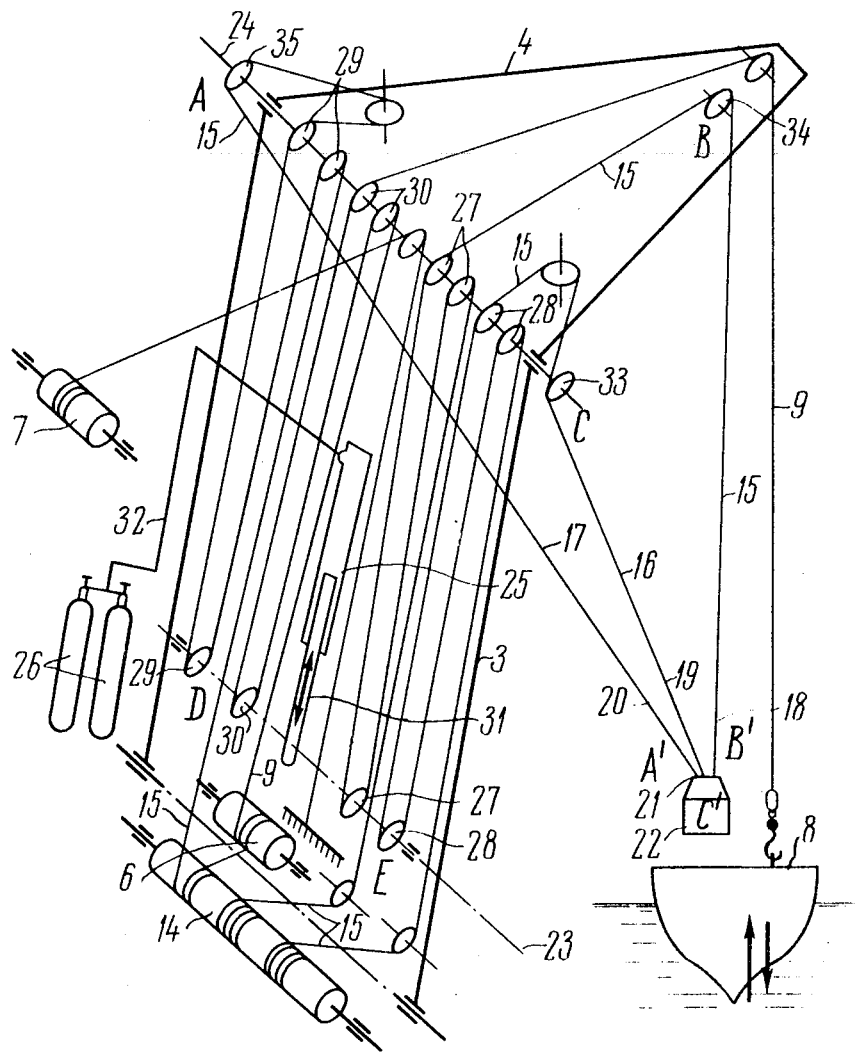
FIG. 4 is a diagrammatic view of a followup system connected to a cargo suspension and to an object being serviced.

The cargo is lowered and lifted by means of the load hoist 5 which includes a triple drum 14 (FIG. 4) about which cargo ropes 15, 16 and 17 are passed, and free ends 18, 19 and 20 of the ropes 15, 16 and 17 are connected to a cargo suspension 21 which carries cargo 22.

The system used for following up the mutual vibration of the ships is constituted by three pulley block arrangements having a movable shaft 23 and a stationary shaft 24 with the shaft 23 being connected a pneumatic cylinder 25 with a pneumatic accumulator 26.

Pulley blocks 27, 28 and 29 are mounted on the shafts 23 and 24 and about which pass respectively the cargo ropes 15, 16 and 17. In addition the shafts 23 and 24 mount blocks 30, one of which carries the followup rope 9 connecting the ship 8 being serviced with the system following up the mutual vibration of the objects.

The pneumatic cylinder 25 is provided with a rod 31 which coacts with the movable shaft 23 coupled with the cargo suspension 21 through the pulley blocks 27, 38 and 29 mounted on the shaft 24. Air is supplied into the pneumatic cylinder 25 from the pneumatic accumulator 26 via a pipe line 32. The followup system also embodies the hoist 6.

The stationary shaft 24 serves at the same time as an axis of the hinge joint connecting the jib 4 with the boom 3 whereby it is possible to simplify the crane design.

Figure 5:
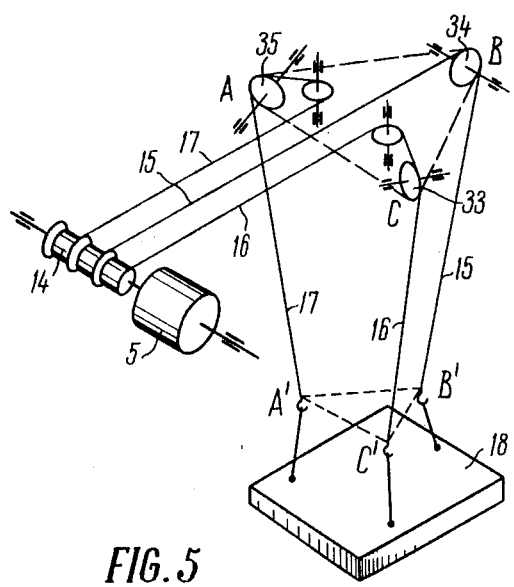
FIG. 5 is a diagrammatic view of a rope cargo suspension connected to the drum of a load hoist.

Secured on the jib 4 are cargo blocks 33, 34 and 35 about which are passed respectively the cargo ropes 15, 16 and 17. The blocks are secured in such a manner that they define an equilateral triangle ABC (FIG. 3) and the planes of rotation of the blocks are aligned with the bisectrix of the respective angles of the triangle ABC thus defined. The cargo ropes 15, 16 and 17 depending from the jib 4 constitute together with the jib and the suspension 21 an imaginary isosceles truncated pyramid ABC A'B'B' (FIG. 5).

The boom length is varied by means of the hoist 7 connected by known means for instance, a cable-and-block system, to the boom 3.

The crane operates as follows:

when effecting loading and unloading operations under rough sea conditions, the followup rope 9 is secured to the ship 8, and the electric motor of the hoist 6 of the followup system is actuated. With the drum of the hoist 6 rotating, the followup rope 9 starts to be wound until the hoist 6 stops under the action of its tension. With the ship 8 going up a wave, i.e. when the tension of the followup rope 9 is loosened, the movable shaft 23 will move downwardly under the action of the pneumatic cylinder 25 supplied with air by the pneumatic accumulator 26.

As a result of an increase in the distance between the movable shaft 23 and the stationary shaft 24, the suspension 21 will move upwardly together with the cargo 22 a distance equal to the height to which the deck of the ship 8 has risen with respect to the base 2 of the crane. With the ship 8 moving downwardly, the followup rope 9 is tensioned, and the rod 31 is retracted into the cylinder 25 to compress the air in the pneumatic accumulator 26. As a result thereof, the distance between the movable shaft 23 and the stationary shaft 24 decreases, and the cargo 22 moves downwardly for the same distance as the deck of the ship 8.

Due to the manner in which the cargo suspension 21 follows up together with the cargo 22, the mutual vibration of the base ship 1 and the ship 8 there is provided a nonimpact stacking of the cargo 22. At the same time, since the cargo ropes 15, 16 and 17 and the followup rope 9 are passed about the pulley block arrangements, swinging of the cargo is eliminated. This is explained by the fact that the cargo 22 is secured in the cargo suspension 21 having the cargo ropes 15, 16 and 17 attached thereto at three points forming the plane of an equilateral triangle ABC. With the cargo center of gravity displaced in the direction of one of the ropes, the tension in the two other ropes increases and the cargo is returned to its initial position.

With length of the boom 3 changed by means of the hoist 7, the liquid flows from one hydraulic cylinder, for example, from the hydraulic cylinder 10, through the pipeline 12 and via the shutoff valve 13 into the other cylinder 11. Hence, the jib 4 hinged to the boom 3 is held in a horizontal position and provides for an equal length of the depending ends of the cargo ropes 15, 16 and 17, thus preserving equal tension in the cargo ropes and preventing swinging the cargo.

As a result, the cargo 22 moves strictly vertically along a straight line since the depending ends of the cargo ropes 15, 16 and 17 are always of an equal length due to the horizontal position of the jib 4, thereby providing for a precise placing of the cargo.

Upon a change in the length of the boom 3, with the cargo drum 14 of the hoist 5 stopped, the cargo 22 moves in a horizontal direction and preserves a constant height of lifting since the jib 4 hinged to the boom 3 maintains a horizontal position.

While in the present crane a pneumatic accumulator connected to a movable shaft through the intermediary of a power pneumatic cylinder is used as a compensating device for the followup system, any other spring-loaded and compensating means may be employed for this purpose. The jib may be held in a horizontal position by means of the drum of the hoist used for changing the boom length, with the drum diameter varying along its axis.

The cargo may be lowered and lifted with the aid of a greater number of cargo ropes, for example, five, although in any case the cargo ropes must together with the jib and suspension define an imaginary isosceles truncated pyramid in which the number of angles is equal to that of the ropes used. However, it is most expedient to secure cargo at three points.

An increase in the number of the cargo ropes used results in the crane design being more complex, whereas, when the cargo is secured at three points, its position is most stable and swinging thereof is minimized.

In accordance with the present invention, the load beam may be constituted as a portal frame with an extending or rigidly secured jib, or as a pantograph.

The utilization of the present crane is not restricted to being mounted on ships and can be used for nonimpact stacking of cargo in any sphere in which transportation operations are fraught with a mutual vibration of the base object and the object being serviced and a swinging of the cargo, as well as in cases in which stricter requirements are set forth with respects to a safe and smooth stacking of the cargo.

When disclosing the embodiment of the present invention, narrow specific terminology has been used for the sake of clarity. The invention, however, is not confined to the terminology used, and it should be borne in mind that every such term embraces all equivalent elements operating in an analogous manner and used for solving the same problems.

Though the present invention has been described with reference to a preferred embodiment thereof, it should be understood that modifications and variations may be made without departing from the spirit and scope of the invention, which will readily present themselves to those skilled in the art.

These modifications and variations are considered to fall within the spirit and scope of the invention as defined in the appended claims.

We claim:

1. A cargo crane for transporting cargo from one object to another object under conditions of the mutual vibration of objects, and more particularly ships operating under rough sea conditions, comprising a load beam defined by a boom; a load hoist; a system following up the mutual vibration of objects; a jib operably connected with the free end of the cargo beam; means for constantly holding said jib in a horizontal position; a cargo rope suspension coupled with said load hoist and the object being serviced via said followup system and including at least three cargo ropes so passing through said jib that said ropes together with the jib and said suspension define an imaginary isosceles truncated pyramid, and said cargo ropes being so connected to the system following up the mutual vibration of the objects as to provide an equal tension of said cargo ropes and distribution of the points at which said suspension is secured in one horizontal plane.

2. The cargo crane according to claim 1, in which the jib is constantly held in a horizontal position by means of two power cylinders operably interconnected, one of said cylinders being hinged to the boom and the jib, and the other cylinder to the boom and the crane base.

3. The cargo crane according to claim 2, in which the jib is hinged to the boom.

4. The cargo crane according to claim 1, in which the system following up the mutual vibration of objects includes at least three pulley block arrangements having a common movable shaft and a common stationary shaft, said shafts mounting pulley blocks carrying the cargo ropes and a rope connecting the followup system with the object being serviced.

5. The cargo crane according to claim 4, in which the stationary shaft serves simultaneously as the axis of the hinge joint connecting the jib with the boom.

6. The cargo crane according to claim 1, in which the cargo ropes are passed onto cargo blocks mounted on the jib, with the planes of rotation of the cargo blocks being aligned with the bisectrix of the angles of the pyramid base.

7. The cargo crane according to claim 2, in which the axes of the power cylinders are disposed parallel with respect to each other.